(12) United States Patent
Chen et al.

(10) Patent No.: US 11,939,471 B2
(45) Date of Patent: Mar. 26, 2024

(54) LIQUID SILICONE RUBBER COMPOSITION

(71) Applicant: DOW SILICONES CORPORATION, Midland, MI (US)

(72) Inventors: Yusheng Chen, Shanghai (CN); Peng Wang, Shanghai (CN); Shaohui Wang, Shanghai (CN); Rui Wang, Shanghai (CN); Jianjun Gao, Jiangsu (CN); Chunming Zhang, Jiangsu (CN)

(73) Assignee: DOW SILICONES CORPORATION, Midland, MI (US)

( * ) Notice: Subject to any disclaimer, the term of this patent is extended or adjusted under 35 U.S.C. 154(b) by 427 days.

(21) Appl. No.: 17/280,444

(22) PCT Filed: Sep. 27, 2019

(86) PCT No.: PCT/CN2019/108345
§ 371 (c)(1),
(2) Date: Mar. 26, 2021

(87) PCT Pub. No.: WO2020/063799
PCT Pub. Date: Apr. 2, 2020

(65) Prior Publication Data
US 2021/0380807 A1    Dec. 9, 2021

(30) Foreign Application Priority Data

Sep. 28, 2018  (WO) ................ PCT/CN2018/108203

(51) Int. Cl.
*C08L 83/04* (2006.01)
*H01B 1/18* (2006.01)
*C08G 77/12* (2006.01)
*C08G 77/20* (2006.01)

(52) U.S. Cl.
CPC .............. *C08L 83/04* (2013.01); *H01B 1/18* (2013.01); *C08G 77/12* (2013.01); *C08G 77/20* (2013.01); *C08L 2203/20* (2013.01)

(58) Field of Classification Search
CPC ..... C08G 77/12; C08G 77/20; C08L 2203/20; C08L 83/00; C08L 83/04; C08L 2205/025; C08K 2201/001; C08K 2201/005; C08K 2201/006; C08K 2201/011; C08K 3/04; C08K 3/041; C08K 3/36; C08K 5/56; H01B 1/18; H01B 1/24
See application file for complete search history.

(56) References Cited

U.S. PATENT DOCUMENTS

| 3,419,593 A | 12/1968 | Willing |
| 3,445,420 A | 5/1969 | Kookootsedes et al. |
| 3,715,334 A | 2/1973 | Karstedt |
| 3,814,730 A | 6/1974 | Karstedt |
| 6,605,734 B2 | 8/2003 | Roy et al. |
| 2003/0213939 A1 | 11/2003 | Narayan et al. |
| 2006/0258819 A1 | 11/2006 | Woerner |
| 2007/0167555 A1 | 7/2007 | Amino et al. |
| 2013/0218050 A1 | 8/2013 | Eichhorn et al. |
| 2014/0305226 A1 | 10/2014 | Eichhorn et al. |
| 2015/0108414 A1 | 4/2015 | Lottes et al. |
| 2015/0123044 A1 | 5/2015 | Yoshida |
| 2015/0228372 A1 | 8/2015 | Akitomo et al. |
| 2016/0102191 A1* | 4/2016 | Park ........................ C08L 83/04 524/264 |
| 2016/0251534 A1 | 9/2016 | Burlett et al. |
| 2017/0329261 A1 | 11/2017 | Salalha et al. |
| 2018/0044498 A1 | 2/2018 | Shigeta et al. |

FOREIGN PATENT DOCUMENTS

| CN | 101240091 A | 8/2008 |
| CN | 103214851 A | 7/2013 |
| CN | 104341778 A | 2/2015 |
| CN | 104583279 A | 4/2015 |
| CN | 103214851 B | 10/2015 |
| CN | 105331110 A | 2/2016 |
| CN | 105385170 A | 3/2016 |
| CN | 106916453 A | 7/2017 |
| CN | 107189445 A | 9/2017 |

(Continued)

OTHER PUBLICATIONS

International Search Report for PCT/CN2019/108345 dated Dec. 27, 2019, 4 pages.
Machine assisted English translation of CN101240091A obtained from https://patents.google.com/patent on Mar. 25, 2021, 10 pages.
Machine assisted English translation of CN103214851A obtained from https://patents.google.com/patent on Mar. 25, 2021, 6 pages.
Machine assisted English translation of CN103214851B obtained from https://patents.google.com/patent on Mar. 25, 2021, 6 pages.
Machine assisted English translation of CN104583279A obtained from https://patents.google.com/patent on Mar. 25, 2021, 9 pages.
Machine assisted English translation of CN105331110A obtained from https://patents.google.com/patent on Mar. 25, 2021, 6 pages.
Machine assisted English translation of CN105385170A obtained from https://patents.google.com/patent on Mar. 25, 2021, 6 pages.

(Continued)

*Primary Examiner* — Mark Kopec
*Assistant Examiner* — Jaison P Thomas
(74) *Attorney, Agent, or Firm* — Warner Norcross + Judd LLP

(57) ABSTRACT

Addition curing electrically conductive liquid silicone rubber (LSR) compositions, their methods of preparation, and cured elastomeric products made from the compositions are provided. The compositions are cured to form elastomeric products suitable for high voltage applications such as cable joints, cable terminal applications, cable accessories and connectors. In general, the composition comprises: (a) at least one polydiorganosiloxane having at least two alkenyl groups per molecule: (b) at least one organohydrogenpolysiloxane: (c) at least one reinforcing filler: (d) at least one hydrosilylation catalyst: and (e) an electrically conductive filler. Component (e) comprises: (i) extra conductive carbon black: and (ii) single walled carbon nanotubes.

13 Claims, No Drawings

(56) References Cited

FOREIGN PATENT DOCUMENTS

| | | |
|---|---|---|
| CN | 109867964 A | 6/2019 |
| IN | 106589953 A | 4/2017 |
| JP | S55108455 A | 8/1980 |
| JP | H08120176 A | 5/1996 |
| JP | 2005062474 A | 3/2005 |
| JP | 2005521782 A | 7/2005 |
| JP | 2006052302 A | 2/2006 |
| JP | 2008170878 A | 7/2008 |
| JP | 2013245329 A | 12/2013 |
| JP | 2015057763 A | 3/2015 |
| JP | 2017014399 A | 1/2017 |
| JP | 2017132832 A | 8/2017 |
| JP | 2018518541 A | 7/2018 |
| KR | 1020180091385 A | 8/2018 |
| KR | 101901633 B1 | 9/2018 |
| WO | 2002082468 A1 | 10/2002 |
| WO | 2005082995 A1 | 9/2005 |
| WO | 2016136275 A1 | 2/2016 |
| WO | 2016110570 | 7/2016 |

OTHER PUBLICATIONS

Machine assisted English translation of CN106589953A obtained from https://patents.google.com/patent on Mar. 25, 2021, 9 pages.
Machine assisted English translation of CN106916453A obtained from https://patents.google.com/patent on Mar. 25, 2021, 8 pages.
Machine assisted English translation of CN107189445A obtained from https://patents.google.com/patent on Mar. 25, 2021, 9 pages.
Machine assisted English translation of JP2017132832A obtained from https://patents.google.com/patent on Mar. 25, 2021, 15 pages.
Machine assisted English translation of JP2017014399A obtained from https://patents.google.com/patent on Jun. 6, 2022, 10 pages.
Machine assisted English translation of KR1020180091385A obtained from https://patents.google.com/patent on Jun. 6, 2022, 15 pages.
Machine assisted English translation of JP2015057763A obtained from https://patents.google.com/patent on Oct. 17, 2023, 9 pages.
Ata S. Features and Application of Carbon Nanotube and Rubber Composites. International Polymer Science and Technology. 2017;44(8):33-38. doi:10.1177/0307174X1704400807.
Arai, Hironori (2006). Manufacturing process and characterization of carbon black. Tanso, 2006(223), 232-243. doi:10.7209/tanso.2006.232.
JIS K 6217-2:2017 Carbon Black For Rubber Industry—Fundamental Characteristics.
Machine assisted English translation of CN101240091A obtained from https://worldwide.espacenet.com/patent on Dec. 5, 2023, 16 pages.
Machine assisted English translation of CN109867964A obtained from https://worldwide.espacenet.com/patent on Dec. 5, 2023, 22 pages.
Machine assisted English translation of JPS55108455A obtained from https://worldwide.espacenet.com/patent on Dec. 5, 2023, 6 pages.
Machine assisted English translation of JPH08120176A obtained from https://worldwide.espacenet.com/patent on Dec. 5, 2023, 8 pages.
Machine assisted English translation of JP2005062474A obtained from https://worldwide.espacenet. com/patent on Dec. 5, 2023, 17 pages.
Machine assisted English translation of JP2006052302A obtained from https://worldwide.espacenet.com/patent on Dec. 5, 2023, 14 pages.
Machine assisted English translation of JP2008170878A obtained from https://worldwide.espacenet.com/patent on Dec. 5, 2023, 29 pages.
Machine assisted English translation of KR101901633B1 obtained from https://worldwide.espacenet.com/patent on Dec. 5, 2023, 24 pages.

\* cited by examiner

LIQUID SILICONE RUBBER COMPOSITION

CROSS-REFERENCE TO RELATED APPLICATIONS

This application is the U.S. National Stage of International Application No. PCT/CN2019/108345 filed on 27 Sep. 2019, which claims priority to and all advantages of International Application No. PCT/CN2018/108203 filed on 28 Sep. 2018, the content of which is incorporated herein by reference.

TECHNICAL FIELD

The present disclosure relates to addition curing electrically conductive liquid silicone rubber (LSR) compositions, their method of preparation and to cured elastomeric products made from the composition. The compositions are cured to form elastomeric products suitable for high voltage applications such as cable joints, cable terminal applications, cable accessories and connectors.

BACKGROUND

Liquid silicone rubber ("LSR") compositions containing electrically conductive ingredients such as metal powders e.g. silver, nickel and copper and carbonaceous powders such as carbon blacks, graphite powders and/or carbon fibres are well known. However, such compositions suffer from a variety of problems including high resistance and/or volume resistivity values, temperature dependent resistance and/or variable resistance and resistivity with time. It has been known to solve such issues by increasing the amount of the electrically conductive ingredients as described above but such composition changes generally result in significantly increased viscosity in the pre-cured compositions consequently causing impaired handling characteristics. As a solution to the high viscosity problem such compositions have been diluted with non-reactive silicones or organic solvents but this has been found to result in compatibility problems with the diluents bleeding out of the subsequently cured silicone elastomeric products with time and furthermore, such products do not always overcome the resistance and resistivity issues.

If highly electrically conductive cured silicone elastomeric products having a volume resistivity of <100 ohm·cm are required e.g. for the manufacture of cable joints with direct contact and shared interface to shielded or conductive or semi-conductive cable insulating materials the dielectric parameters for the joint material have to be carefully selected and/or adjusted. Preferred conductive fillers for such applications include types of carbon black sometimes referred to as "extra" conductive carbon blacks. Whilst these types of carbon blacks do improve conductivity properties, they are essentially non-reinforcing from a filler perspective with respect to the silicone composition and as such high loading levels (i.e. >6% by weight of the composition) of these carbon black(s) can result in unwanted dispersion and air bubbling issues linked to the consequential high viscosities resulting from the high levels of carbon black in the uncured LSR compositions results and in poor workability of the compositions during injection moulding and coating applications. Furthermore, resulting cured silicone elastomeric materials have inferior physical properties such as poor elasticity, to the extent of brittleness of the elastomeric product as well as having poor mechanical properties such as elongation (<500% or even <400%) when the compositions are cured to elastomeric products.

As previously indicated, the unsuitably high viscosities caused by high loading levels of conductive filler in LSR compositions lead to unwanted air bubbles and poor dispersion, in particular of conductive carbon black materials therein. As a consequence this can cause further inadequate physical properties and/or failure during expansion pushing for high voltage insulation (HVI) cable accessories and the like.

Hence, there has been a long term need in the industry for the provision of a suitable conductive silicone rubber which can solve the above prior art problems. However it is to be appreciated that many of the above issues are conflicting because e.g. consequences of adding more conductive filler e.g. carbon black into a composition to improve conductivity are poorer mechanical properties such as elongation, and significant unwanted increases in viscosity of the composition. Furthermore, excessive amounts of carbon black may also have an adverse effect on the cure of the silicone rubber elastomeric products due to surface properties and/or impurities.

SUMMARY

There is provided herein a conductive liquid silicone rubber composition, which comprises:
 (a) one or more polydiorganosiloxane(s) having at least two alkenyl groups per molecule,
 (b) at least one organohydrogenpolysiloxane,
 (c) from 10 to 25% by weight of the composition, of at least one reinforcing filler
 (d) at least one hydrosilylation catalyst, and,
 (e) an electrically conductive filler containing
  (i) From 1.5 to 5.5% by weight of the composition of extra conductive carbon black and
  (ii) From 0.05 to 1% by weight of the composition of single walled carbon nanotubes.

DETAILED DESCRIPTION

It has been found that whilst introducing multi-walled carbon nanotubes has very little effect, the introduction of a small amount of single-walled carbon nanotubes into the composition avoids the need to introduce a large amount of carbon black, e.g. in this case extra conductive carbon black into the composition. Reducing the amount of extra conductive carbon black avoids the consequence of poor physical properties and potential brittleness of the resulting elastomeric properties caused by high levels of carbon black being in the composition. The fact that only a low level of single walled carbon nanotubes is introduced helps deliver the physical properties being sought within the industry for liquid silicone rubber compositions of this sort because whilst it significantly improves conductivity it advantageously does so with minimal influence on mechanical properties and viscosity. Furthermore, the ability to avoid the addition of higher levels of extra conductive carbon black enables the inclusion of additional reinforcing fillers leading to the improved physical properties desired.

The Ingredients of the Composition:

a) Polydiorganosiloxane(s) Having at Least Two Alkenyl Groups Per Molecule

Ingredient (a) is one or more polydiorganosiloxanes containing at least two silicon-bonded alkenyl groups per molecule. Suitable alkenyl groups in ingredient (a) typically contain from 2 to 10 carbon atoms, preferred example, vinyl, isopropenyl, allyl, and 5-hexenyl. Ingredient (a) typically additionally comprises silicon-bonded organic groups other than alkenyl groups. Such silicon-bonded organic groups are typically selected from monovalent saturated hydrocarbon groups, which typically contain from 1 to 10 carbon atoms, and monovalent aromatic hydrocarbon groups, which typically contain from 6 to 12 carbon atoms, which are unsubstituted or substituted with the groups that do not interfere with curing of this inventive composition, such as halogen atoms. Preferred species of the silicon-bonded organic groups are, for example, alkyl groups such as methyl, ethyl, and propyl; halogenated alkyl groups such as 3,3,3-trifluoropropyl; and aryl groups such as phenyl.

The molecular structure of the or each polydiorganosiloxane containing at least two silicon-bonded alkenyl groups per molecule of ingredient (a) is typically linear, however, there can be some branching due to the presence of trivalent siloxane units within the molecule. To achieve a useful level of physical properties in the elastomer prepared by curing the LSR composition of the present invention, the viscosity of the or each polydiorganosiloxane containing at least two silicon-bonded alkenyl groups per molecule in ingredient (a) is from 150 mPa·s to 150,000 mPa·s measured using a rotational viscometer such as a Brookfield rheometer, or by using a capillary viscometer, in particular a Brookfield DV-III Ultra Programmable Rheometer for viscosities ≥50,000 mPa·s, and a Brookfield DV 3T Rheometer for viscosities less than 50,000 mPa·s, unless otherwise indicated. Unless otherwise indicated all viscosity measurements are undertaken at 25° C. The upper limit for the viscosity of the or each polydiorganosiloxane containing at least two silicon-bonded alkenyl groups per molecule of ingredient (a) is not specifically restricted and is typically limited only by the processability of the LSR composition of the present invention.

Examples of ingredient (a) are polydiorganosiloxanes containing alkenyl groups at the two terminals and are represented by the general formula (I):

R'R"R'''SiO—(R"R'''SiO)$_m$—SiOR'''R"R'  (I)

In formula (I), each R' is an alkenyl group, which typically contains from 2 to 10 carbon atoms, such as vinyl, allyl, and 5-hexenyl. Alternatively each R' is a vinyl. Typically the alkenyl content, e.g. vinyl content of the polymer is from 0.01 to 3% by weight for each polydiorganosiloxane containing at least two silicon-bonded alkenyl groups per molecule of component (a), alternatively from 0.025 to 2.5% by weight of component (a), alternatively from 0.025 to 2.0% by weight of the or each polydiorganosiloxane containing at least two silicon-bonded alkenyl groups per molecule of component (a), as determined by $^1$H nmr.

R" does not contain ethylenic unsaturation, Each R" may be the same or different and is individually selected from monovalent saturated hydrocarbon groups, which typically contain from 1 to 10 carbon atoms, and monovalent aromatic hydrocarbon groups, which typically contain from 6 to 12 carbon atoms. R" may be unsubstituted or substituted with one or more groups that do not interfere with curing of the composition as hereinbefore described, such as halogen atoms. R''' is R' or R". m represents a degree of polymerization suitable for ingredient (a) to have a viscosity of from 150 mPa·s to 150,000 mPa·s at 25° C. measured using a rotational viscometer such as a Brookfield rheometer, or by using a capillary viscometer, in particular a Brookfield DV-III Ultra Programmable Rheometer for viscosities ≥50,000 mPa·s, and a Brookfield DV 3T Rheometer for viscosities less than 50,000 mPa·s, unless otherwise indicated.

Typically, all R" and R''' groups contained in a compound in accordance with formula (I) are methyl groups. Alternatively at least one R" and/or R''' group in a compound in accordance with formula (I) is methyl and the others are phenyl or 3,3,3-trifluoropropyl. This preference is based on the availability of the reactants typically used to prepare the polydiorganosiloxanes (ingredient (a) and the desired properties for the cured elastomer prepared from compositions comprising such polydiorganosiloxanes.

Typical examples of the or each polydiorganosiloxane containing at least two silicon-bonded alkenyl groups per molecule of ingredient (a) containing ethylenically unsaturated hydrocarbon groups only in terminal groups include, but are not limited to dimethylvinylsiloxy-terminated polydimethylsiloxane, dimethylvinylsiloxy-terminated polymethyl-3,3,3-trifluoropropylsiloxane, dimethylvinylsiloxy-terminated dimethylsiloxane-3,3,3-trifluoropropylmethylsiloxne copolymer, and dimethylvinylsiloxy-terminated dimethylsiloxane/methylphenylsiloxane copolymer. When R''' is R' the polymer might be dimethylvinylsiloxy-terminated polyvinyl methylsiloxane or dimethylvinylsiloxy-terminated polydimethylvinyl methylsiloxane.

Generally, the or each polydiorganosiloxane containing at least two silicon-bonded alkenyl groups per molecule of ingredient (a) has a viscosity of from 150 mPa·s to 150,000 mPa·s at 25° C., alternatively from 200 mPa·s to 125,000 mPa·s, alternatively from 200 mPa·s to 100,000 mPa·s at 25° C. measured using a rotational viscometer such as a Brookfield rheometer, or by using a capillary viscometer, in particular a Brookfield DV-III Ultra Programmable Rheometer for viscosities ≥50,000 mPa·s, and a Brookfield DV 3T Rheometer for viscosities less than 50,000 mPa·s, unless otherwise indicated.

In one option the composition may comprise more than one polydiorganosiloxane containing at least two silicon-bonded alkenyl groups per molecule for example a relatively high viscosity polymer e.g. having a viscosity in the range of 50,000 to 100,000 mPa·s at 25° C., alternatively 50,000 to 75,000 mPa·s at 25° C., alternatively 55,000 to 70,000 mPa·s at 25° C., measured using a Brookfield DV-III Ultra Programmable Rheometer and having a vinyl content of from 0.04 to 0.2% wt., determined by $^1$H nmr; alternatively from 0.04 to 0.15% wt. determined by $^1$H nmr; in combination with a medium viscosity polymer and/or a low viscosity polymer the medium viscosity polymer having a viscosity in the range of 5,000 to 20,000 mPa·s at 25° C., alternatively 5000 to 17500 mPa·s at 25° C., alternatively 7500 to 15,000 mPa·s at 25° C. measured using a Brookfield DV 3T Rheometer and having a vinyl content of from 0.075 to 0.2% wt., determined by $^1$H nmr; alternatively from 0.1 to 0.175% wt., determined by $^1$H nmr; and the low viscosity polymer having a viscosity of having a viscosity in the range of 150 to 1000 mPa·s at 25° C., alternatively 150 to 750 mPa·s at 25° C., alternatively 150 to 600 mPa·s at 25° C. measured using a Brookfield DV 3T Rheometer and having a vinyl content of from 0.075 to 0.2% wt., determined by $^1$H nmr; alternatively from 0.1 to 0.175% wt., determined by $^1$H nmr;

(b) Organohydrogenpolysiloxane

Ingredient (b) is an organohydrogenpolysiloxane, which operates as a cross-linker for cross-linking polymer (a), by undergo a hydrosilylation (addition) reaction by way of its silicon-bonded hydrogen atoms with the alkenyl groups in ingredient (a) catalysed by one or more hydrosilylation catalysts discussed below. Ingredient (b) normally contains 3 or more silicon-bonded hydrogen atoms which react with the alkenyl groups of ingredient (a) to form a network structure. Some or all of Ingredient (b) may alternatively have 2 silicon bonded hydrogen atoms per molecule when component (a) has >2 alkenyl groups per molecule.

The molecular configuration of ingredient (b) is not specifically restricted, and it can be linear, branched or cyclic. The viscosity of ingredient (b) is typically from 20 to 5000 mPa·s at 25° C., alternatively 20 to 2500 mPa·s at 25° C., alternatively 20 to 500 mPa·s at 25° C. measured using a Brookfield DV 3T Rheometer.

Ingredient (b) is typically added in an amount such that the molar ratio of the total number of the silicon-bonded hydrogen atoms in ingredient (b) to the total number of all alkenyl groups in ingredient (a) is from 0.5:1 to 5:1, alternatively, 0.5:1 to 4:1, alternatively from 1:1 to 3:1. When this ratio is less than 0.5:1, a well-cured composition will not be obtained. When the ratio exceeds 5:1, there is a tendency for the hardness of the cured composition to increase when heated.

Examples of ingredient (b) include but are not limited to:
(i) trimethylsiloxy-terminated methylhydrogenpolysiloxane,
(ii) trimethylsiloxy-terminated polydimethylsiloxane-methylhydrogensiloxane,
(iii) dimethylhydrogensiloxy-terminated dimethylsiloxane-methylhydrogensiloxane copolymers,
(iv) dimethylsiloxane-methylhydrogensiloxane cyclic copolymers,
(v) copolymers composed of $(CH_3)_2HSiO_{1/2}$ units and $SiO_{4/2}$ units, and
(vi) copolymers composed of $(CH_3)_3SiO_{1/2}$ units, $(CH_3)_2HSiO_{1/2}$ units, and $SiO_{4/2}$ units.

(c) Reinforcing Filler

A reinforcing filler such as finely divided fumed silica or precipitated silica is used in LSR compositions to achieve high level of physical properties that characterize some types of cured elastomer that can be prepared using the LSR composition. Silica and other reinforcing fillers are often treated with one or more known filler treating agents to prevent a phenomenon referred to as "creping" or "crepe hardening" during processing of the curable composition.

Finely divided forms of silica such as fumed and/or precipitated silica are preferred reinforcing fillers. Fumed silicas are particularly preferred because of their relatively high surface area, which is typically at least 50 $m^2/g$. Fillers having surface areas of from 100 to 600 $m^2/g$ measured in accordance with the BET method in accordance with ISO 9277: 2010, alternatively of from 100 to 500 $m^2/g$ (using the BET method in accordance with ISO 9277: 2010), alternatively of from 200 to 400 $m^2/g$ (using the BET method in accordance with ISO 9277: 2010), are typically used.

The amount of finely divided silica or other reinforcing filler used in the LSR composition of the present invention is typically present in an amount of from about 10 to 25 weight % of the composition, alternatively from 11 to 20 weight % of the composition alternatively from 11 to 18 weight % of the composition.

When the filler is naturally hydrophilic (e.g. untreated silica fillers), it is typically treated with a treating agent. This may be prior to introduction in the composition or in situ (i.e. in the presence of at least a portion of the other ingredients of the LSR composition of the present invention by blending these ingredients together until the filler is completely treated and uniformly dispersed to for a homogeneous material). Untreated filler may be in situ with a treating agent in the presence of ingredient (a).

Typically the filler is surface treated using for example a fatty acid or a fatty acid ester such as a stearate, or with organosilanes, polydiorganosiloxanes, or organosilazanes hexaalkyl disilazane or short chain siloxane diols to render the filler(s) hydrophobic and therefore easier to handle and obtain a homogeneous mixture with the other ingredients. The surface treatment of the fillers of component (c) renders the fillers hydrophobic and therefore easily wetted by the silicone polymer(s) in the composition, most importantly of component (a) into which it is normally mixed to prepare a base. This results in improved room temperature mechanical properties of the uncured compositions.

Typically the filler treating agent can be any low molecular weight organosilicon compounds disclosed in the art applicable to prevent creping of organosiloxane compositions during processing.

The treating agents are exemplified but not limited to hydroxyl-terminated polydiorganosiloxane containing an average from 2 to 20 repeating units of diorganosiloxane in each molecule, hexaorganodisiloxane, hexaorganodisilazane, and the like. The hexaorganodisilazane intends to hydrolyse under conditions used to treat the filler to form the organosilicon compounds with hydroxyl groups. Typically, at least a portion of the silicon-bonded hydrocarbon groups present in the treating agent are identical to a majority of the hydrocarbon groups present in ingredients (a) and (b). A small amount of water can be added together with the silica treating agent(s) as processing aid.

The filler may be treated with the treating agent prior to formulating, and the treated filler is commercially available.

(d) Hydrosilylation Catalyst

Curing of the LSR composition of the present invention is catalyzed by ingredient (d), which is a hydrosilylation catalyst that is one of the platinum metals (platinum, ruthenium, osmium, rhodium, iridium and palladium), or a compound of one or more of such metals. Platinum and platinum compounds are preferred due to the high activity level of these catalysts in hydrosilylation reaction.

Example of preferred curing catalysts include but are not limited to platinum black, platinum on various solid supports, chloroplatinic acids, alcohol solutions of chloroplatinic acid, and complexes of chloroplatinic acid with ethylenically unsaturated compounds such as olefins and organosiloxanes containing ethylenically unsaturated silicon-bonded hydrocarbon groups. The catalyst can be platinum metal, platinum metal deposited on a carrier, such as silica gel or powdered charcoal, or a compound or complex of a platinum group metal.

Examples of suitable platinum based catalysts include
(i) complexes of chloroplatinic acid with organosiloxanes containing ethylenically unsaturated hydrocarbon groups are described in U.S. Pat. No. 3,419,593;
(ii) chloroplatinic acid, either in hexahydrate form or anhydrous form;
(iii) a platinum-containing catalyst which is obtained by a method comprising reacting chloroplatinic acid with an aliphatically unsaturated organosilicon compound, such as divinyltetramethyl disiloxane;
(iv) alkene-platinum-silyl complexes as described in U.S. Pat. No. 6,605,734 such as $(COD)Pt(SiMeCl_2)_2$ where "COD" is 1,5-cyclooctadiene; and/or
(v) Karstedt's catalyst, a platinum divinyl tetramethyl disiloxane complex typically containing about 1 wt. % of platinum in a solvent, such as toluene may be used. These are described in U.S. Pat. Nos. 3,715,334 and 3,814,730.

The catalyst is present in the total composition in a catalytic amount, i.e., an amount or quantity sufficient to promote a reaction or curing thereof at desired conditions. Varying levels of the catalyst can be used to tailor reaction rate and cure kinetics. The catalytic amount of the catalyst is generally between 0.01 ppm, and 10,000 parts by weight of platinum-group metal, per million parts (ppm), based on the combined weight of the composition ingredients (a) and (b); alternatively between 0.01 and 5000 ppm; alternatively between 0.01 and 3,000 ppm, and alternatively between 0.01 and 1,000 ppm. In specific embodiments, the catalytic amount of the catalyst may range from 0.01 to 1,000 ppm, alternatively 0.01 to 500 ppm, alternatively 0.01 to 100 ppm, and alternatively 0.01 to 750 ppm, of metal based on the weight of the composition. The ranges may relate solely to the metal content within the catalyst or to the catalyst altogether (including its ligands) as specified, but typically these ranges relate solely to the metal content within the catalyst. The catalyst may be added as a single species or as a mixture of two or more different species. Typically, dependent on the form/concentration in which the catalyst package is provided the amount of catalyst present will be within the range of from 0.001 to 3.0% by weight of the composition.

Mixtures of the aforementioned ingredients (a), (b), and (d) may begin to cure at ambient temperature. Hence, liquid silicone rubber compositions as hereinbefore described are generally stored in two parts which are mixed together immediately before use. The two parts are generally referred to as Part (A) and Part (B) and are designed to keep ingredients (b) the cross-linker(s) and (d) the catalyst(s) apart to avoid premature cure.

Component (e) Electrically Conductive Filler

Component (e) is electrically conductive filler containing
(i) From 1.5 to 5.5% by weight of the composition of an extra conductive carbon black and
(ii) From 0.05 to 1% by weight of the composition of single walled carbon nanotubes.

Extra conductive carbon black is a highly conductive carbon black having at least one of the following properties:
(i) A BET surface area of at least 500 $m^2/g$, alternatively a BET surface area of from 500 to 1600 $m^2/g$, alternatively from 500 to 1500 $m^2/g$, alternatively from 600 to 1300 $m^2/g$ $m^2/g$, alternatively from 750 to 1250 $m^2/g$ in each of these as determined by ASTM D 6556;
(ii) a D50 aggregate particle size of between 5 to 500 nm, alternatively from 10 to 200 nm, as measured using photosedimentometry (DCP) according to ISO 15825: 2017; and/or
(iii) a dibutyl phthalate (DBP) pore volume of 300-600 ml/100 g, alternatively 300-550 ml/100 g, alternatively of 300-400 ml/100 g, as measured using ASTM D-2414.

ISO 15825:2017 specifies a method for determining the size distribution of carbon black aggregates, using a disc centrifuge photosedimentometer. This technique is based on the hydrodynamic behaviour of carbon black in a centrifugal field. The determination of the aggregate size distribution is important in the evaluation of carbon black used in the rubber industry.

The extra conductive carbon black is present in the composition herein in an amount of from 1.5 to 5.5% by weight of the composition, alternatively from 1.5 to 5.0, alternatively from 1.75 to 5% by weight of the composition.

Carbon nanotubes (CNTs) are allotropes of carbon which are nanomaterials in which graphene sheets composed of carbon atoms arranged into a hexagonal honeycomb are rolled up into tubes having a diameter ranging from about several nanometers to several hundreds of nanometers. Carbon nanotubes show peculiar electrical, mechanical and physiochemical properties due to their special electronic structure resulting from the configuration and the nanometer-order diameter.

Carbon Nanotubes are categorized as single-walled nanotubes (SWNTs) and multi-walled nanotubes (MWNTs). Single-walled carbon nanotubes (SWNTs) are seamless cylinders comprised of a layer of graphene. Multi-walled carbon nanotubes (MWNTs) consist of multiple rolled layers of graphene. MWNTs have not been well-defined due to their structural complexity and variety when compared to SWNTs. Nonetheless, MWNTs exhibit advantages over SWNTs, such as ease of mass production, low product cost per unit, and enhanced thermal and chemical stability. As will be seen from the examples it has been surprisingly identified that use of SWNTs can be seen to enhance the composition herein where multi wall carbon nanotubes appear to have the opposite effect. SWNTs are present in the composition in an amount of from 0.05 to 1% by weight of the composition, alternatively from 0.05 to 0.75% by weight of the composition, alternatively from 0.075 to 0.75% by weight of the composition. In one alternative the SWNTs may be provided in a masterbatch or solvent or the like, for example in trimethyl terminated polydimethylsiloxane. When in solution or in a masterbatch the equivalent amount of carbon nanotubes must be incorporated into the composition as if added in the absence of the solvent/masterbatch or the like.

Inhibitor

To obtain a longer working time or pot life of the LSR composition of the present invention, a suitable inhibitor can be used in order to retard or suppress the activity of the catalyst.

Inhibitors of hydrosilylation catalysts, generally a platinum metal based catalyst are well known in the art. Hydrosilylation or Addition-reaction inhibitors include hydrazines, triazoles, phosphines, mercaptans, organic nitrogen compounds, acetylenic alcohols, silylated acetylenic alcohols, maleates, fumarates, ethylenically or aromatically unsaturated amides, ethylenically unsaturated isocyanates, olefinic siloxanes, unsaturated hydrocarbon monoesters and diesters, conjugated ene-ynes, hydroperoxides, nitriles, and diaziridines.

One class of known inhibitors of platinum catalysts includes the acetylenic compounds disclosed in U.S. Pat. No. 3,445,420. Acetylenic alcohols such as 2-methyl-3-butyn-2-ol constitute a preferred class of inhibitors that will suppress the activity of a platinum-containing catalyst at 25° C. Compositions containing these inhibitors typically require heating at temperature of 70° C. or above to cure at a practical rate.

Examples of acetylenic alcohols and their derivatives include 1-ethynyl-1-cyclohexanol (ETCH), 2-methyl-3-butyn-2-ol, 3-butyn-1-ol, 3-butyn-2-ol, propargylalcohol, 2-phenyl-2-propyn-1-ol, 3,5-dimethyl-1-hexyn-3-ol, 1-ethynylcyclopentanol, 1-phenyl-2-propynol, 3-methyl-1-penten-4-yn-3-ol, and mixtures thereof.

When present, inhibitor concentrations as low as 1 mole of inhibitor per mole of the metal of catalyst (d) will in some instances impart satisfactory storage stability and cure rate. In other instances inhibitor concentrations of up to 500 moles of inhibitor per mole of the metal of catalyst (d) are required. The optimum concentration for a given inhibitor in a given composition is readily determined by routine experimentation. Dependent on the concentration and form in which the inhibitor selected is provided/available commercially, when present in the composition, the inhibitor is typically present in an amount of from 0.0125 to 10% by weight of the composition.

Additional Optional Ingredients

Additional optional ingredients may be present in the liquid silicone rubber composition as hereinbefore described depending on the intended final use thereof. Examples of such optional ingredients include thermally conductive fillers, pot life extenders, flame retardants, lubricants, non-reinforcing fillers, pigments and/or coloring agents, adhesion promoters, chain extenders, mold release agents, UV light stabilizers, bactericides, wetting agent, heat stabilizer, compression set additive, plasticizer, and mixtures thereof.

Pot life extenders, such as triazole, may be used, but are not considered necessary in the scope of the present invention. The liquid curable silicone rubber composition may thus be free of pot life extender.

Examples of flame retardants include aluminium trihydrate, chlorinated paraffins, hexabromocyclododecane, triphenyl phosphate, dimethyl methylphosphonate, tris(2,3-dibromopropyl) phosphate (brominated tris), and mixtures or derivatives thereof.

Examples of lubricants include tetrafluoroethylene, resin powder, graphite, fluorinated graphite, talc, boron nitride, fluorine oil, silicone oil, molybdenum disulfide, and mixtures or derivatives thereof. When present in the composition, flame retardants are typically present in an amount of from 0.1 to 5% by weight of the composition Further additives include silicone fluids, such as trimethylsilyl or OH terminated siloxanes. Such trimethylsiloxy or OH terminated polydimethylsiloxanes typically have a viscosity <150 mPa·s at 25° C. measured using a Brookfield DV 3T Rheometer. When present such silicone fluid may be present in the liquid curable silicone rubber composition in an amount ranging of from 0.1 to 5% by weight (% wt.), based on the total weight of the composition and may function as mold release agents.

Examples of pigments include titanium dioxide, chromium oxide, bismuth vanadium oxide, iron oxides and mixtures thereof.

Examples of coloring agents for textile coating include pigments, vat dyes, reactive dyes, acid dyes, chrome dyes, disperse dyes, cationic dyes and mixtures thereof.

In a preferred embodiment of the invention, the pigments and dyes are used in form of pigment masterbatch composed of them dispersed in the polydiorganosiloxane with a low viscosity (ingredient (a)) at the ratio of 25:75 to 70:30.

Examples of adhesion promoters include alkoxysilane containing methacrylic groups or acrylic groups such as methacryloxymethyl-trimethoxysilane, 3-methacryloxypropyl-trimethoxysilane, 3-methacryloxypropyl-methyldimethoxysilane, 3-methacryloxypropyl-dimethylmethoxysilane, 3-methacryloxypropyl-triethoxysilane, 3-methacryloxypropyl-methyldiethoxysilane, 3-methacryloxyisobutyl-trimethoxysilane, or a similar methacryloxy-substituted alkoxysilane; 3-acryloxypropyl-trimethoxysilane, 3-acryloxypropyl-methyldimethoxysilane, 3-acryloxypropyl-dimethyl-methoxysilane, 3-acryloxypropyl-triethoxysilane, or a similar acryloxy-substituted alkyl-containing alkoxysilane; zirconium chelate compound such as zirconium (IV) tetraacetyl acetonate, zirconium (IV) hexafluoracetyl acetonate, zirconium (IV) trifluoroacetyl acetonate, tetrakis (ethyltrifluoroacetyl acetonate) zirconium, tetrakis (2,2,6,6-tetramethyl-heptanethionate) zirconium, zirconium (IV) dibutoxy bis(ethylacetonate), diisopropoxy bis (2,2,6,6-tetramethyl-heptanethionate) zirconium, or similar zirconium complexes having β-diketones (including alkyl-substituted and fluoro-substituted forms thereof); epoxy-containing alkoxysilanes such as 3-glycidoxypropyl trimethoxysilane, 3-glycidoxypropyl triethoxysilane, 3-glycidoxypropyl methyldimethoxysilane, 4-glycidoxybutyl trimethoxysilane, 5,6-epoxyhexyl triethoxysilane, 2-(3,4-epoxycyclohexyl) ethyltrimethoxysilane, or 2-(3,4-epoxycyclohexyl) ethyltriethoxysilane.

Examples of chain extenders include disiloxane or a low molecular weight polyorganosiloxane containing two silicon-bonded hydrogen atoms at the terminal positions. The chain extender typically reacts with the alkenyl groups of ingredient (a), thereby linking two or more molecules of ingredient (a) together and increasing its effective molecular weight and the distance between potential cross-linking sites.

A disiloxane is typically represented by the general formula $(HR^a_2Si)_2O$. When the chain extender is a polyorganosiloxane, it has terminal units of the general formula $HR^a_2SiO_{1/2}$ and non-terminal units of the formula $R^b_2SiO$. In these formulae, $R^a$ and $R^b$ individually represent unsubstituted or substituted monovalent hydrocarbon groups that are free of ethylenic unsaturation, which include, but are not limited to alkyl groups containing from 1 to 10 carbon atoms, substituted alkyl groups containing from 1 to 10 carbon atoms such as chloromethyl and 3,3,3-trifluoropropyl, cycloalkyl groups containing from 3 to 10 carbon atoms, aryl containing 6 to 10 carbon atoms, alkaryl groups containing 7 to 10 carbon atoms, such as tolyl and xylyl, and aralkyl groups containing 7 to 10 carbon atoms, such as benzyl.

Further examples of chain extenders include tetramethyldihydrogendisiloxane or dimethylhydrogen-terminated polydimethylsiloxane.

When component (a) has two vinyl groups per molecule, cross-linker (b) has 3 or more S—H groups per molecule to ensure the formation of a cross-linked network. Cross-linker (b) may only have two Si—H groups per molecule when polymer (a) has 3 or more vinyl groups per molecule. However, when polymer has two Si-vinyl groups per molecule optionally chain extenders as hereinbefore described may be added. When present, the chain extender may be present in any amount up to 3% by weight of the composition, alternatively the chain extender may be present in an amount of from 0.1% to 3% by weight of the composition, alternatively, 0.1% to 2.5% by weight of the composition.

Chain extenders suitable for use in the present compositions have viscosities from about 1 mPa·s to 1000 mPa·s at 25° C., alternatively from 1 mPa·s to 500 mPa·s at 25° C., alternatively from 1 mPa·s to 100 mPa·s at 25° C. measured using a Brookfield DV 3T Rheometer.

Examples of heat stabilizers include metal compounds such as red iron oxide, yellow iron oxide, ferric hydroxide, cerium oxide, cerium hydroxide, lanthanum oxide, copper phthocyanine. Aluminum hydroxide, fumed titanium dioxide, iron naphthenate, cerium naphthenate, cerium dimethylpolysilanolate and acetylacetone salts of a metal chosen from copper, zinc, aluminum, iron, cerium, zirconium, titanium and the like. The amount of heat stabilizer present in a composition may range from 0.01 to 1.0% weight of the total composition.

The present invention thus provides a liquid silicone rubber composition, which comprises:
(a) one or more polydiorganosiloxane(s) having at least two alkenyl groups per molecule,
(b) at least one organohydrogenpolysiloxane, alternatively at least one organohydrogenpolysiloxane in an amount such that the molar ratio of the total number of the silicon-bonded hydrogen atoms in ingredient (b) to the total number of all alkenyl groups in ingredient (a) is from 0.5:1 to 5:1

(c) from 10 to 25% by weight of the composition, of at least one reinforcing filler (d) at least one hydrosilylation catalyst, and, (e) an electrically conductive filler containing
  (i) From 1.5 to 5.5% by weight of the composition of extra conductive carbon black and
  (ii) From 0.05 to 1% by weight of the composition of single walled carbon nanotubes.

The composition may also include one or more additives selected from the list of inhibitor(s), mold release agent(s), chain extender(s), heat stabilizer(s), flame retardant(s) and pigment(s)/colouring agent(s). Hence, the composition may be any combination of the following (a) one or more polydiorganosiloxane(s) having at least two alkenyl groups per molecule, (b) at least one organohydrogenpolysiloxane, alternatively at least one organohydrogenpolysiloxane in an amount such that the molar ratio of the total number of the silicon-bonded hydrogen atoms in ingredient (b) to the total number of all alkenyl groups in ingredient (a) is from 0.5:1 to 5:1

(c) from 10 to 25% by weight of the composition, of at least one reinforcing filler (d) at least one hydrosilylation catalyst, in an amount of between 0.01 ppm, and 10,000 parts by weight of platinum-group metal, per million parts (ppm), based on the combined weight of the composition ingredients (a) and (b) and, (e) an electrically conductive filler containing
  (i) From 1.5 to 5.5% by weight of the composition of extra conductive carbon black and
  (ii) From 0.05 to 1% by weight of the composition of single walled carbon nanotubes; and optionally any one or more of inhibitor(s), mold release agent(s); chain extender(s); heat stabilizer(s); flame retardant(s); and pigment(s)/colouring agent(s) providing the total % weight of the composition is 100%.

In each case when the aforementioned optional ingredients are present they are present within the following ranges:

inhibitor(s), in an amount of from 1 to 500 moles of inhibitor per mole of the metal of catalyst (d);

mold release agent(s), in an amount of from 0.1 to 5% by weight of the composition;

chain extender(s), in an amount of from 0.1 to 3% by weight of the composition;

heat stabilizer(s), in an amount of from 0.01 to 1.0% weight of the total composition flame retardant(s) in an amount of from 0.1 to 5% by weight of the composition.

Typically prior to use the composition is stored in two parts, Part A and part B to keep ingredients (b) and (d) apart to avoid premature cure. Typically a Part A composition will comprise components (a), (c) and (d) and Part B will comprise components (a), (b) and (c) and inhibitor when present. component (e) above may be present in either or both Part A and Part B.

Additives when present in the composition may be in either Part A or Part B providing they do not negatively affect the properties of any other ingredient (e.g. catalyst inactivation). The part A and part B of a liquid silicone rubber composition are mixed together shortly prior to use to initiate cure of the full composition into a silicone elastomeric material. The compositions can be designed to be mixed in any suitable ratio e.g. part A:part B may be mixed together in ratios of from 10:1 to 1:10, alternatively from 5:1 to 1:5, alternatively from 2:1 to 1:2, but most preferred is a ratio of 1:1.

Ingredients in each of Part A and/or Part B may be mixed together individually or may be introduced into the composition in pre-prepared in combinations for, e.g. ease of mixing the final composition. For Example components (a) and (c) are often mixed together to form an LSR polymer base prior to addition with other ingredients. These may then be mixed with the other ingredients of the Part being made directly or may be used to make pre-prepared concentrates commonly referred to in the industry as masterbatches.

In this instance, for ease of mixing ingredients, one or more masterbatches may be utilised to successfully mix the ingredients to form Part A and/or Part B compositions. For example a "fumed silica" masterbatch may be prepared. This is effectively an LSR silicone rubber base containing several optional additives. Any suitable additive may be incorporated into such a masterbatch. Alternatively or additionally as a means of introducing the conductive fillers a conductive filler masterbatch may be utilised. Such a masterbatch may comprise for example component (a), component (c) and component (e) and suitable optional additives, or alternatively might be a mixture of the aforementioned fumed silica masterbatch and the electrically conductive fillers (e). any other suitable combinations of the ingredients may be utilised to form a concentrate/masterbatch to improve ease of introduction.

The composition of the present invention may be prepared by combining all of ingredients at ambient temperature. Any mixing techniques and devices described in the prior art can be used for this purpose. The particular device to be used will be determined by the viscosities of ingredients and the final curable coating composition. Suitable mixers include but are not limited to paddle type mixers e.g. planetary mixers and kneader type mixers. Cooling of ingredients during mixing may be desirable to avoid premature curing of the composition.

However, whilst the order for mixing ingredients is not absolutely critical, it was found that, in particular, the development and use of a conductive filler masterbatch gave a significant benefit to the processing of the composition. The use of carbon blacks in electrically conductive compositions whilst often preferred historically by the industry had processing problems, in particular dispersion problems of carbon black in the silicone composition, particularly when high levels were required to provide the conductive properties desired. It was found that making a conductive filler masterbatch comprising components (a), (c) and (e) and optional additives using a roll mill grinding process, alternatively a 3 mill grinding process, enhanced the stability of conductivity results as well as reduced electrically conductive filler particle dispersion when making both Parts A and B and also when mixing parts A and B together to make the final composition immediately before use/cure.

One of the major advantages of this composition is the fact that the viscosity of the final composition is kept reasonably low ≤350,000 mPa·s at 25° C., at a shear rate of 10 s$^{-1}$, measured using an AR2000 EX plate-plate rheometer from TA Instruments of Delaware USA; typically in a range of from 150,000 to 350,000 at 25° C., at a shear rate of 10 s$^{-1}$, measured using an AR2000 EX plate-plate rheometer; alternatively from 200,000 to 300,000 mPa·s at 25° C., at a shear rate of 10 s$^{-1}$, measured using an AR2000 EX plate-plate rheometer from TA Instruments of Delaware USA.

There is therefore also provided a process for the manufacture of the composition as hereinbefore described comprising the steps of
(i) preparing a conductive filler masterbatch by mixing together
   a. a silicone rubber base material, comprising a dimethyl vinyl terminated polydimethylsiloxane (a) and a reinforcing filler (c);
   b. conductive fillers (e)
   c. one or more dimethyl vinyl terminated polydimethylsiloxanes (a);
(ii) introducing the conductive filler masterbatch of (i) into a Part A composition containing a dimethyl vinyl terminated polydimethylsiloxane (a), reinforcing filler (c) and a hydrosilylation catalyst (d) and/or into a Part B composition containing a dimethyl vinyl terminated polydimethylsiloxane (a), reinforcing filler (c) and at least one organohydrogenpolysiloxane (b), wherein Part A contains no organohydrogenpolysiloxane (b) and Part B contains no hydrosilylation catalyst (d) and
(iii) mixing Part A and Part B together.

The dimethyl vinyl terminated polydimethylsiloxane (a) in component a. of step (i) has a viscosity which is > than the viscosity of the one or more dimethyl vinyl terminated polydimethylsiloxanes (a) in component c. of step (i). for example the dimethyl vinyl terminated polydimethylsiloxane (a) in component a. of step (i) may have a viscosity of 50,000 to 150,000 mPa·s at 25° C., alternatively 55,000 to 100,000 mPa·s at 25° C., alternatively 55,000 to 80,000 mPa·s at 25° C. in each case measured using a Brookfield DV-III Ultra Programmable Rheometer and the viscosity of the one or more dimethyl vinyl terminated polydimethylsiloxanes (a) in component c. of step (i) being from 150 mPa·s to 25,000 mPa·s at 25° C., alternatively from 200 mPa·s to 20,000 mPa·s at 25° C., alternatively being a mixture of a second and third dimethyl vinyl terminated polydimethylsiloxanes the second having a viscosity of from 5000 mPa·s to 25,000 mPa·s at 25° C., alternatively from 7,500 mPa·s to 20,000 mPa·s at 25° C. measured using a Brookfield DV 3T Rheometer and a third dimethyl vinyl terminated polydimethylsiloxanes having a viscosity of from 150 mPa·s to 1,000 mPa·s at 25° C., alternatively from 200 to 500 mPa·s at 25° C. in each case measured using a Brookfield DV 3T Rheometer.

Step (i) of the process may comprise pre-mix the components in a mixer to form an initial mixture and then mixing the resulting initial mixture on a three-roll mill. It was found that this resulted in more stable conductivity results and improved dispersion of the electrically conductive fillers in the composition. Preferably the viscosity of the conductive filler masterbatch is from 500,000 to 1,200,000 mPa·s at 25° C., at a shear rate of 10 s$^{-1}$, measured using an AR2000 EX plate-plate rheometer from TA Instruments of Delaware USA Typically Part A and Part B are mixed in a ratio of about 1:1 immediately before use in order to avoid premature cure.

The present liquid silicone rubber composition may alternatively be further processed by injection moulding, encapsulation moulding, press moulding, dispenser moulding, extrusion moulding, transfer moulding, press vulcanization, centrifugal casting, calendaring, bead application or blow moulding.

Curing of the liquid curable silicone rubber composition may be carried at any suitable temperature. Typical curing temperatures may range of from 80 to 200° C., alternatively of from 90-150° C. as and when required samples may be additionally post-cured by heating to a temperature of 130° C. to 200° C. for 4 Hours.

Curing can for example take place in a mold to form a moulded silicone article. The composition may for example be injection moulded to form an article, or the composition can be overmoulded by injection moulding around an article or over a substrate.

Given the electrical applications for which this material has been developed, the industry are generally seeking an elastomeric product which when cured has a shore A hardness in the range of from 30 to 50, alternatively from 35 to 48 when measured based on ASTM D2204 and the composition as hereinbefore provided can satisfy this requirement whilst also having an elongation ≥500%, e.g. from 550 to 600% as tested in accordance with ASTM D412 and composition viscosity ≤350,000 mPa·s at 25° C. e.g. from 250,000 to 300,000 mPa·s at 25° C., at a shear rate of 10 s$^{-1}$, measured using a AR2000 EX plate-plate rheometer from TA Instruments of Delaware USA which property combination has been found to be problematic historically for electrically conductive silicone rubber materials because of the level of carbon black in the composition. Not only does the present composition satisfy the above it can also be shown to have a stable volume resistivity of <100 Ω·cm e.g. from about 30 to about 60 Ω·cm using test method Chinese National Test method GB/T 3048.3-2007 and is able to adhere to other liquid silicone rubber materials, especially insulation based materials. It has also been determined that the bonding with insulating LSR products is acceptable for purpose.

In one embodiment, the present invention relates to an article cured from the liquid curable silicone rubber composition. Such articles include those that may be used in high voltage, alternating current (AC) applications such as cable joints, cable terminal applications, cable accessories e.g. high voltage insulation (HVI) cable accessories and connectors, e.g., electrical insulators, single-wire seals, plug connector seals, automobile components such as connector seal electric and electronic parts such as rolls in a copying machine and packing in a microwave oven.

The liquid curable silicone rubber composition may be cured into silicone elastomer articles, such as tubes, strips, solid cord or custom profiles according to the size specifications of the manufacturer.

The cured silicone elastomer obtained from curing the liquid curable silicone rubber composition of the present invention may provide for composite parts where mechanical or chemical bonding to a substrate occurs.

In one embodiment, the present invention relates to a composite part comprising a silicone elastomer cured from the liquid curable silicone rubber composition on a substrate.

The composition as hereinbefore described can be used per se as conductive elastomer once cured but may be used in combination with other materials well known in the design of high voltage AC applications, e.g. insulators given for examples said cable joints or cable terminations often have a multi-layer design, whereby at least one of the materials is providing high conductivity such as the elastomer cured from the current composition is part of the joint as shielding material, and other materials such as silicone rubber insulating materials may be used in combination therewith. Some parts of such cable accessories can have the form of a tube or tube-like trumpet and can therefore be manufactured by an extrusion process.

EXAMPLES

All viscosities were measured at 25° C. unless otherwise indicated. Viscosities of individual ingredients in the following examples were measured using a Brookfield DV-III Ultra Programmable Rheometer for viscosities ≥50,000 mPa·s, and a Brookfield DV 3T Rheometer for viscosities less than 50,000 mPa·s, unless otherwise indicated.

A liquid silicone rubber base as disclosed in Table 1 was used in the following working examples. As an initial step a silicone base composition, having the composition as listed in Table 1 below, was prepared in a kneader mixer

TABLE 1

| Silicone base composition (containing optional additives): | Weight % |
|---|---|
| Fumed silica surface area of about 300 m²/g (ISO 9277: 2010) | 28.15 |
| dimethylvinyl-terminated polydimethylsiloxane (1) having a viscosity of 65,000 mPa · s | 65.0 |
| Hexamethyldisilazane | 5.0 |
| Dimethylhydroxy terminated vinylmethyl dimethyl polysiloxane having a viscosity of about 30 mPa · s | 0.15 |
| Water | 1.7 |

The base composition as prepared in accordance with the composition indicated in Table 1 was then used in the preparation of a conductive filler masterbatch composition in accordance with Table 2.

TABLE 2

| Conductive Filler masterbatch Composition | Weight % |
|---|---|
| Extra conductive carbon black having a BET surface area of 1000 m²/g (ASTM D 6556) | 8.76 |
| Single wall carbon nanotube in trimethylterminated polydimethylsiloxane, (10% active) | 3.44 |
| dimethylvinyl-terminated polydimethylsiloxane (2) having a viscosity of 12,000 mPa · s | 48.2 |
| dimethylvinyl-terminated polydimethylsiloxane (3) having a viscosity of 300 mPa · s | 6.26 |
| Silicone base material (Table 1) | 33.34 |

The ingredients of the conductive filler masterbatch composition were pre-mixed together in a planetary mixer and then were further mixed using a 3-roll mill.

As previously indicated rather than making the final composition, to avoid premature cure, three compositions as hereinbefore described were prepared, each having a Part A composition (Table 3) containing the hydrosilylation catalyst (Pt) and excluding cross-linker and a Part B composition (Table 4) containing cross-linker and no catalyst were individually prepared using the compositions detailed in Table 3 and 4 below.

TABLE 3

| | LSR Part A Compositions | | |
|---|---|---|---|
| Formulation of LSR Part A | Inventive Example 1 (wt. %) | Inventive Example 2 (wt. %) | Inventive Example 3 (wt. %) |
| Conductive masterbatch (Table 2) | 39.75 | 39.75 | 20.6 |
| Silicone base composition (Table 1) | 53.85 | 53.85 | 57.50 |
| Single wall carbon nanotube masterbatch (10% active) | | | 2.70 |
| dimethylvinyl-terminated polydimethylsiloxane (1) | | | 18.10 |
| dimethylvinyl-terminated polydimethylsiloxane (2) | 5.00 | 5.00 | |
| Dimethylhydroxy terminated polydimethylsiloxane having a viscosity of 15 mPa · s | 0.45 | 0.45 | 0.45 |
| Platinum catalyst solution | 0.95 | 0.95 | 0.65 |

The platinum catalyst solution is a platinum catalyst/vinyl polymer dispersion having about 1.43 wt. % divinyltetramethyldisiloxane complex of platinum (CAS #68478-92-2) or about 0.7 wt. % platinum group metal.

TABLE 4

| | LSR Part B Compositions | | |
|---|---|---|---|
| Formulation LSR Part B | Inventive Example 1 (wt. %) | Inventive Example 2 (wt. %) | Inventive Example 3 (wt. %) |
| Conductive masterbatch (Table 2) | 55.50 | 49.50 | 27.4 |
| Silicone base composition (Table 1) | 31.15 | 37.15 | 48.45 |
| Single wall carbon nanotube masterbatch (10% active) | | | 2.70 |
| dimethylvinyl-terminated polydimethylsiloxane (1) | | | 13.30 |
| dimethylvinyl-terminated polydimethylsiloxane(2) | 4.50 | 4.50 | |
| Dimethylhydroxy terminated polydimethylsiloxane having a viscosity of 15 mPa · s | 0.45 | 0.45 | 0.45 |
| Inhibitor/vinyl polydimethylsiloxane dispersion containing 3% by weight ETCH | 4.00 | 4.00 | 4.00 |
| Trimethylsiloxy-terminated polydimethyl methylhydrogensiloxane having about 0.7% wt. % H as SiH and a viscosity of about 40 mPa · s | 2.65 | 2.65 | 2.40 |
| Dimethylhydrogensiloxy-terminated polydimethylsiloxane having about 0.15% wt. % H as SiH and a viscosity of about 10 mPa · s | 1.75 | 1.75 | 1.30 |

Table 5 below shows the total filler content in wt % in the above 3 examples as hereinbefore described.

TABLE 5

| | Total Amount of each Filler in the combination of Part A and Part B | | |
|---|---|---|---|
| Total filler Content | Inventive Example 1 (wt. %) | Inventive Example 2 (wt. %) | Inventive Example 3 (wt. %) |
| Extra conductive carbon black | 4.18 | 3.91 | 2.00 |
| Single wall carbon nanotube | 0.164 | 0.153 | 0.35 |
| Fumed silica | 16.43 | 17.07 | 17.11 |

The resulting Part A and Part B compositions were mixed together in a suitable mixer and the resulting final composition was cured for a period of 10 minutes at a temperature of 120° C. and post cured at a temperature of 150° C. for 4 hours. After mixing and/or cure the physical properties of the three examples were assessed and are tabulated in Table 6 below

TABLE 6

Physical Properties of Final Composition and Cured Elastomer Products

| Performance testing: | Inventive Example 1 | Inventive Example 2 | Inventive Example 3 |
|---|---|---|---|
| Viscosity- (Pa · s), at a shear rate of 10 s$^{-1}$, measured using a AR2000 EX plate-plate rheometer from TA Instruments of Delaware USA | 260 | 230 | 240 |
| Volume resistance (Ω · cm) - GB/T 3048.3-2007 | 28 | 31.3 | 43 |
| Hardness (Shore A) - ASTM D2204 | 41 | 43 | 43 |
| Tensile strength (MPa) - ASTM D412 | 7.11 | 7.49 | 6.77 |
| Elongation (%) - ASTM D412 | 568 | 606 | 560 |
| Tear (Die B, kN/m)- ASTM D624B | 29.4 | 31.3 | 33.1 |
| Bond with insulation LSR (N/25 mm) | 54 | 50 | 55 |

The Bond with insulation LSR test was undertaken by subjecting samples to a 1800 peel test using an Inston tensiometer at a crosshead speed of 50 mm/min.

It can be seen the examples above all showed characteristics sought, not least low viscosity, stable volume resistivity, higher elongation and acceptable bond strength compared to the comparatives.

Three comparative compositions were also provided using either extra conductive carbon black or single walled carbon nanotubes as the conductive fillers. As was the case with the examples 1-3 above the three comparative examples were made initially into two parts. Each comparative composition having a Part A composition (Table 7) containing the hydrosilylation catalyst (Pt) and excluding cross-linker and a Part B composition (Table 8) containing cross-linker and no catalyst were individually prepared using the compositions detailed in Table 7 and 8 below.

TABLE 7

Part A Composition of Comparative examples

| Formulation of LSR Part A | Comp. Example 1 (wt. %) | Comp. Example 2 (wt. %) | Comp. Example 3 (wt. %) |
|---|---|---|---|
| Extra conductive carbon black | 6.00 | 6.00 | |
| Silicone base composition (Table 1) | 39.9 | 44.3 | 58.00 |
| Single wall carbon nanotube masterbatch (10% active) | | | 6.00 |
| dimethylvinyl-terminated polydimethylsiloxane (1) | 47.35 | 39.01 | 34.95 |
| dimethylvinyl-terminated polydimethylsiloxane (3) | 4.5 | 8.8 | |
| Dimethylhydroxy terminated polydimethylsiloxane having a viscosity of 15 mPa · s | 0.45 | 0.45 | 0.45 |
| Platinum catalyst solution (as above) | 1.80 | 1.44 | 0.60 |

TABLE 8

Part B Composition of Comparative Examples

| Formulation of LSR Part B | Comp. Example 1 (wt. %) | Comp. Example 2 (wt. %) | Comp. Example 3 (wt. %) |
|---|---|---|---|
| Extra conductive carbon black | 6.00 | 6.00 | |
| Silicone base composition (Table 1) | 39.9 | 44.3 | 78.65 |
| Conductive masterbatch (Table 2) | | | 6.00 |
| dimethylvinyl-terminated polydimethylsiloxane (1) | 40.53 | 32.75 | 7.50 |
| dimethylvinyl-terminated polydimethylsiloxane (3) | 4.5 | 8.8 | |
| Dimethylhydroxy terminated polydimethylsiloxane having a viscosity of 15 mPa · s | 0.45 | 0.45 | 0.45 |
| Inhibitor/vinyl polydimethyl-siloxane dispersion containing 3% by weight ETCH | 4.50 | 4.50 | 4.00 |
| Trimethylsiloxy-terminated polydimethyl methylhydrogensiloxane having about 0.7% wt. % H as SiH and a viscosity of about 40 mPa · s | 2.53 | 3.20 | 1.90 |
| Dimethylhydrogensiloxy-terminated polydimethylsiloxane having about 0.15% wt. % H as SiH and a viscosity of about 10 mPa · s | 1.59 | | 1.00 |

Table 9 below shows the total filler content in wt. % in the above 3 examples as hereinbefore described.

TABLE 9

Total Amount of Each Filler in the Combination of Part A and Part B for the Comparative Examples

| Total filler Content | Comparative Example 1 | Comparative Example 2 | Comparative Example 3 |
|---|---|---|---|
| Extra conductive carbon black | 6.00 | 6.00 | |
| Single wall carbon nanotube | | | 0.60 |
| Fumed silica | 11.30 | 12.5 | 19.60 |

The resulting Part A and Part B compositions of the comparative examples were mixed together in a suitable planetary mixer and the resulting final composition was cured for a period of 10 minutes at a temperature of 120° C. and post cured at a temperature of 150° C. for 4 hours. After mixing and/or cure the physical properties of the three examples were assessed and are tabulated in Table 10 below

TABLE 10

Physical Properties of final Composition and Cured Elastomer Products of the Comparative Examples

| Performance testing: | Comparative Example 1 | Comparative Example 2 | Comparative Example 3 |
|---|---|---|---|
| Viscosity- (Pa · s)), at a shear rate of 10 s$^{-1}$, measured using a AR2000 EX plate-plate rheometer from TA Instruments of Delaware USA | 380 | 400 | 220 |
| Volume resistance(Ω · cm) - GB/T 3048.3-2007 | 58 | 56 | 48 |
| Hardness (Shore A) - ASTM D2204 | 34.5 | 40 | 51 |
| Tensile strength (MPa) - ASTM D412 | 6.44 | 6.0 | 7.17 |

TABLE 10-continued

Physical Properties of final Composition and Cured Elastomer Products of the Comparative Examples

| Performance testing: | Comparative Example 1 | Comparative Example 2 | Comparative Example 3 |
|---|---|---|---|
| Elongation (%) - ASTM D412 | 626 | 400 | 595 |
| Tear (Die B, KN/m)- ASTM D624B | 27.1 | 30 | 28 |
| Bond with insulation LSR (N/25 mm) | 39.86 | 39.86 | 39.9 |

It will be seen that the comparatives containing extra conductive carbon black as the conductive filler had viscosities >350,000 mPa·s, much higher volume resistivity results than the examples above and variable elongation values and poorer bond with insulation results. The comparative composition relying on single walled carbon nanotubes had low viscosity values but had pretty high Shore A hardness and volume resistivity results including high cost. None provided all the characteristics sought unlike the examples above.

What is claimed is:

1. A conductive liquid silicone rubber composition, the composition comprising:
    (a) at least one polydiorganosiloxane having at least two alkenyl groups per molecule;
    (b) at least one organohydrogenpolysiloxane;
    (c) at least one reinforcing filler present in an amount of from 10 to 25% by weight of the composition;
    (d) at least one hydrosilylation catalyst; and
    (e) an electrically conductive filler comprising;
        (i) extra conductive carbon black present in an amount of from 1.5 to 5.5% by weight of the composition, and
        (ii) single walled carbon nanotubes present in an amount of from 0.05 to 1% by weight of the composition.

2. The conductive liquid silicone rubber composition in accordance with claim 1, comprising at least two polydiorganosiloxanes having at least two alkenyl groups per molecule, each having a viscosity of from 150 mPa·s to 150,000 mPa·s at 25° C., measured using a Brookfield DV-III Ultra Programmable Rheometer for viscosities ≥50,000 mPa·s, and a Brookfield DV 3T Rheometer for viscosities less than 50,000 mPa·s.

3. The conductive liquid silicone rubber composition in accordance with claim 1, comprising: a first polydiorganosiloxane having at least two alkenyl groups per molecule and a viscosity in the range of from 50,000 to 100,000 mPa·s at 25° C., measured using a Brookfield DV-III Ultra Programmable Rheometer; a second polydiorganosiloxane having at least two alkenyl groups per molecule and a viscosity in the range of from 5,000 to 20,000 mPa·s at 25° C., measured using a Brookfield DV 3T Rheometer; and a third polydiorganosiloxane having at least two alkenyl groups per molecule and a viscosity in the range of from 150 to 1,000 mPa·s at 25° C., measured using a Brookfield DV 3T Rheometer.

4. The conductive liquid silicone rubber composition in accordance with claim 1, wherein the reinforcing filler (c) is a fumed silica having a surface area of from 100 to 600 $m^2/g$ using the BET method.

5. The conductive liquid silicone rubber composition in accordance with claim 1, wherein the extra conductive carbon black (e)(i) has at least one of the following properties:
    (i) a BET surface area of at least 500 $m^2/g$, optionally of from 500 to 1,600 $m^2/g$, optionally of from 500 to 1,500 $m^2/g$, optionally of from 600 to 1,300 $m^2/g$, optionally of from 750 to 1,250 $m^2/g$, as determined by ASTM D 6556; and/or
    (ii) a D50 aggregate particle size of between 5 to 500 nm, optionally of from 10 to 200 nm, as measured by using disc centrifuge photosedimentometry (DCP) according to ISO 15825:2017; and/or
    (iii) a dibutyl phthalate (DBP) pore volume of from 300 to 600 ml/100 g, optionally of from 300 to 550 ml/100 g, optionally of from 300 to 400 ml/100 g, as measured using ASTM D-2414.

6. The conductive liquid silicone rubber composition in accordance with claim 1, wherein the composition is stored before use in two parts, Part A and part B, to keep components (b) and (d) separate to avoid premature cure of the composition.

7. The conductive liquid silicone rubber composition in accordance with claim 6, wherein Part A includes components (a), (c), and (d), and wherein Part B includes components (a), (b), and (c).

8. The conductive liquid silicone rubber composition in accordance with claim 7, wherein part B also includes a cure inhibitor.

9. The conductive liquid silicone rubber composition in accordance with claim 1, further comprising at least one additive selected from the group consisting of:
    (i) at least one inhibitor present in an amount of from 1 to 500 moles of inhibitor per mole of component (d);
    (ii) at least one mold release agent present in an amount of from 0.1 to 5% by weight of the composition;
    (iii) at least one chain extender present in an amount of from 0.1 to 3% by weight of the composition;
    (iv) at least one heat stabilizer present in an amount of from 0.01 to 1.0% weight of the composition;
    (v) at least one flame retardant present in an amount of from 0.1 to 5% by weight of the composition;
    (vi) at least one pigment and/or at least one colouring agent; and
    (vii) combinations thereof.

10. A process for the manufacture of the composition in accordance with claim 1, wherein component (a) comprises dimethyl vinyl terminated polydimethylsiloxanes, the process comprising the steps of:
    I) preparing a conductive filler masterbatch by mixing together;
        i) a silicone rubber base material comprising a first dimethyl vinyl terminated polydimethylsiloxane (a) and component (c);
        ii) component (e); and
        iii) at least one dimethyl vinyl terminated polydimethylsiloxane (a);
    II) introducing the conductive filler masterbatch of step I) into a Part A composition including a dimethyl vinyl terminated polydimethylsiloxane (a), component (c), and component (d), and/or into a Part B composition including a dimethyl vinyl terminated polydimethylsiloxane (a), component (c), and component (b), wherein Part A contains no component (b) and Part B contains no component (d); and
    III) mixing Part A and Part B together.

11. The process in accordance with claim 10, wherein the first dimethyl vinyl terminated polydimethylsiloxane (a) of step I) has a viscosity of from 50,000 to 150,000 mPa·s at 25° C., measured using a Brookfield DV-III Ultra Programmable Rheometer, and wherein the at least one dimethyl vinyl terminated polydimethylsiloxane (a) of step I) is a mixture of second and third dimethyl vinyl terminated polydimethylsiloxanes, with the second dimethyl vinyl terminated polydimethylsiloxane having a viscosity of from 5,000 to 25,000 mPa·s at 25° C., measured using a Brookfield DV 3T Rheometer, and the third dimethyl vinyl terminated polydimethylsiloxane having a viscosity of from 150 to 1,000 mPa·s at 25° C., measured using a Brookfield DV 3T Rheometer.

12. The process in accordance with claim 10, wherein step I) comprises pre-mixing the components in a mixer to form an initial mixture and then mixing the resulting initial mixture on a three-roll mill.

13. An article cured from the conductive liquid curable silicone rubber composition in accordance with claim 1, the article selected from the group consisting of cable joints, cable terminal applications, cable accessories, spark-plug connectors, electrical insulators, single-wire seals, plug connector seals, tubing and valves, automobile components, connector seals, spark plug boots, electric and electronic parts, rolls for copy machines, and packing for microwave ovens.

\* \* \* \* \*